United States Patent [19]

Bussink et al.

[11] 4,122,131
[45] Oct. 24, 1978

[54] POLYBLEND COMPOSITION COMPRISING AROMATIC POLYCARBONATE, POLYOLEFIN, SELECTIVELY HYDROGENATED BLOCK COPOLYMER AND OLEFINIC COPOLYMER

[75] Inventors: Jan Bussink, Bergen Op Zoom; Johannes Wilhelmus Jacobus De Munck, Huybergen; Petrus Cornelius Aloysius Maria van Abeelen, Gilze, all of Netherlands

[73] Assignee: General Electric Company, Pittsfield, Mass.

[21] Appl. No.: 833,365

[22] Filed: Sep. 14, 1977

[51] Int. Cl.$^2$ ............................................. C08L 67/06
[52] U.S. Cl. ............................ 260/873; 260/37 PC; 260/42.17; 260/42.18; 260/42.22; 260/42.47; 260/876 B; 260/878 R; 260/880 B; 260/889; 260/892; 260/894; 260/897 R
[58] Field of Search ............................... 260/873, 876 B

[56] References Cited

U.S. PATENT DOCUMENTS

| | | | |
|---|---|---|---|
| 2,999,835 | 9/1961 | Goldberg | 260/42 |
| 3,130,177 | 4/1964 | Grabowski | 260/45.5 |
| 3,162,695 | 12/1964 | Grabowski | 260/873 |
| 3,239,582 | 3/1966 | Keskkula et al. | 260/873 |
| 3,281,383 | 10/1966 | Zelinski et al. | 260/23.7 |
| 3,333,024 | 7/1967 | Haefele et al. | 260/880 |
| 3,431,224 | 3/1969 | Goldblum | 260/13 |
| 3,686,365 | 8/1972 | Sequeira | 260/876 B |
| 3,753,936 | 8/1973 | Marrs | 260/27 R |
| 3,813,358 | 5/1974 | O'Connell | 260/873 X |
| 3,852,393 | 12/1974 | Furukawa et al. | 260/873 |
| 3,852,394 | 12/1974 | Kubota et al. | 260/873 |
| 3,864,428 | 2/1975 | Nakamura et al. | 260/873 |
| 3,880,783 | 4/1975 | Serini et al. | 260/3 |
| 3,882,192 | 5/1975 | Elghani et al. | 260/873 |
| 3,933,941 | 1/1976 | Yonemitsu et al. | 260/873 |
| 3,963,804 | 6/1976 | Yonemitsu et al. | 260/873 |
| 3,981,843 | 9/1976 | Yoshizaki et al. | 260/45.75 B |
| 3,985,826 | 10/1976 | Futamura | 260/876 B |

FOREIGN PATENT DOCUMENTS 2,329,585  1/1975  Fed. Rep. of Germany.

OTHER PUBLICATIONS

Groggins, Unit Processes in Organic Synthesis Chem. Eng. Series, 5ed, (McGraw-Hill, 1952), pp. 616-620.

*Primary Examiner*—Thomas De Benedictis, Sr.
*Attorney, Agent, or Firm*—Morgan, Finnegan, Pine, Foley & Lee

[57] ABSTRACT

There are provided compositions comprising (a) an aromatic polycarbonate resin; and (b) a precompounded polymer system comprising an olefinic resin and a selectively hydrogenated elastomeric block copolymer resin, alone or in further combination with an aromatic polycarbonate or styrene resin and, optionally a hydrogenated elastomeric block copolymer resin. The use of (a) and (b) together provides high impact strength and unexpectedly superior flowability in the molten state.

10 Claims, No Drawings

POLYBLEND COMPOSITION COMPRISING AROMATIC POLYCARBONATE, POLYOLEFIN, SELECTIVELY HYDROGENATED BLOCK COPOLYMER AND OLEFINIC COPOLYMER

This invention relates to novel resin compositions and more particularly, to polymer compositions comprising aromatic polycarbonate resin, and a precompounded blend of an olefinic resin and a hydrogenated elastomeric block copolymer of a vinyl aromatic compound and an olefinic elastomer alone or in further combination with an aromatic polycarbonate, a styrene resin, and, optionally, a hydrogenated elastomeric block copolymer of a vinyl aromatic compound and an olefinic elastomer.

BACKGROUND OF THE INVENTION

The brittleness in thick section and the relatively poor stress crack resistance of parts molded from aromatic polycarbonate resins is a matter of common knowledge and experience. In addition, polycarbonates per se are difficult to melt process, e.g. to extrude and mold, because of their high melt viscosity. These problems have been partially overcome in the art by blending polyolefins or various rubbers into the aromatic polycarbonate resins. See, for example, Goldblum, U.S. Pat. No. 3,431,224, and German Pat. No. 2,329,585, dated Jan. 2, 1975, the disclosures of which are incorporated herein by reference. Unfortunately, these additives are somewhat limited in scope of use, because at high enough levels to cause significant advantageous effects, there is also a tendency to delaminate after molding, indicating a certain degree of incompatibility.

In applicants' copending application, U.S. Ser. No. 833,364, filed concurrently herewith, under Attorney's Docket GE-708 (8-CH-2705), and incorporated herein by reference, a major improvement is disclosed in providing high impact strength combinations of aromatic polycarbonate resins with remarkably enhanced flowability. The improvement comprises adding to the aromatic polycarbonate a selectively hydrogenated rubbery block copolymer.

It has now been discovered that aromatic carbonate resins per se can be even more remarkably improved in terms of impact strength, especially in thick walled moldings and processing improved if they are intimately admixed with a precompounded easily dispersible polymer system comprising the selectively hydrogenated rubbery block copolymer and a polyolefin resin, and, if desired, mixing in a further amount of a hydrogenated block copolymer.

The resulting compositions show no tendency to delaminate. They also have improved stress crack resistance; high aging resistance; and high heat resistance during processing.

It is believed that the surprising efficiency of the system is attributable to the special features of system (b). System (b) consists of (i) a precompounded mixture of a selectively hydrogenated vinyl aromatic-olefin-vinyl aromatic block copolymer and (ii) an olefinic resin, e.g., polyethylene, polypropylene, ethylene/propylene copolymers, and the like, at a ratio of 20/80 to 80/20, of (i) to (ii) by weight. In any case, dispersibility in component (b) can be further improved by adding an aromatic polycarbonate or polystyrene as a dispersing aid in an amount of up to 100 parts by weight of resinous components.

The new compositions may also be reinforced, e.g., with fibrous glass, and rendered flame retardant with flame retardant additives to extend their field of use in molded products.

DESCRIPTION OF THE INVENTION

According to the present invention, there are provided high impact strength thermoplastic compositions comprising an intimate blend of:

(a) an aromatic polycarbonate resin; and (b) a precompounded composition comprising from 80 to 20 parts by weight of an olefinic resin comprising polyethylene or a poly-α-olefin resin, alone, or in further combination with an aromatic polycarbonate resin or a styrene resin and correspondingly from 20 to 80 parts by weight of a selectively hydrogenated linear, sequential or radial teleblock copolymer of a vinyl aromatic compound $(A)_n$ and $(A)_n{}^1$ and an olefinic elastomer (B), of the A-B-A$^1$; A-(B-A-B)$_n$-A; A(BA)$_n$B; $(A)_4B$; $B(A)_4$; or $B[(AB)_nB]_4$ type, wherein n is an integer of 1 to 10; and, optionally, (c) a selectively hydrogenated elastomeric block copolymer of one of the types set forth in (b).

Preferred compositions will be those in which component (a) comprises from 99 to 60 parts by weight and component (b) comprises from 1 to 40 parts by weight and component (c) comprises from 0 to 20 parts by weight of the total weight of components (a), (b) and (c). In particularly preferred compositions, component (b) comprises from 80 to 20 parts by weight and component (c) from 20 to 80 parts by weight of the total weight of (b) and (c).

In the compositions of this invention, the aromatic polycarbonate component (a), and if used in (b), will be an aromatic polycarbonate of a dihydric phenol and a carbonate precursor such as phosgene, a haloformate or a carbonate ester. Generally speaking, such carbonate polymers may be typified as possessing recurring structural units of the formula

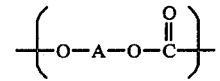

wherein A is a divalent aromatic radical of the dihydric phenol employed in the polymer producing reaction. Preferably, the carbonate polymers used to provide the resinous component (a) have an intrinsic viscosity (as measured in p-dioxane in deciliters per gram at 30° C.) ranging from about 0.35 to about 0.75. The dihydric phenols which may be employed to provide such aromatic polycarbonate polymers are mononuclear and polynuclear aromatic compounds, containing as functional groups, 2 hydroxyl radicals, each of which is attached directly to a carbon atom of an aromatic nucleus. Illustrative dihydric phenols are 2,2-bis (4-hydroxyphenyl)propane (Bisphenol-A); hydroquinone; resorcinol; 2,2-bis-(4-hydroxyphenyl)pentane; 2,4'-dihydroxydiphenyl methane; bis-(2-hydroxyphenyl)methane; bis-(4-hydroxyphenyl)methane; bis-(4-hydroxy-5-nitrophenyl)methane; 1,1-bis(4-hydroxyphenyl)ethane; 3,3-bis-(4-hydroxyphenyl)pentane; 2,2'-dihydroxy-diphenyl; 2,6-dihydroxy naphthalene; bis-(4-hydroxyphenyl sulfone); 2,4'-dihydroxy-diphenyl)sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether;

4,4'-dihydroxy-2,5-diethoxydiphenyl ether; 2,2-bis-(3,5-dichloro-4-hydroxyphenyl)propane; 2,2-bis-(3,5-dibromo-4-hydroxyphenyl) propane; 2,2-bis-(3,5-dimethyl-4-hydroxy phenyl)propane; and the like.

A variety of additional dihydric phenols which may be employed to provide such carbonate polymers are disclosed in Goldberg, U.S. Pat. No. 2,999,835. It is, of course, known to employ two or more different dihydric phenols or a dihydric phenol in combination with a glycol, a hydroxy terminated polyester, or a dibasic acid in the event that a carbonate copolymer rather than a homopolymer, e.g., bisphenol A and tetrabromobisphenol A with flame retardant properties, is desired for use as component (a) in the compositions of this invention.

When a carbonate ester is used as the carbonate precursor in the polymer forming reaction, the materials are reacted at temperatures of from 100° C. or higher for times varying from 1 to 15 hours. Under such conditions, ester interchange occurs between the carbonate ester and the dihydric phenol used. The ester interchange is advantageously consummated at reduced pressures of the order of from about 10 to about 100 mm. of mercury, preferably in an inert atmosphere, such as nitrogen or argon, for example.

Although the polymer forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952), pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di(tolyl) carbonate.

A preferred method for preparing the carbonate polymers suitable for use in providing the compositions of the present invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylaniline, quinoline, etc.). The acid acceptor may be used undiluted or diluted with inert organic solvents, as for example, methylene chloride, chlorobenzene, or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the polycarbonate resin compositions of the invention comprises adding phosgene to an alkaline aqueous suspension of the dihydric phenol used. This is preferably done in the presence of inert solvents such as methylene chloride, 1,2-dichloroethane and the like. Quaternary ammonium compounds may be employed to catalyze the reaction.

A fourth method for preparing such carbonate polymers involves the phosgenation of an agitated suspension of the anhydrous alkali salts of the dihydric phenol used in a nonaqueous medium such as benzene, chlorobenzene, and toluene. This reaction is illustrated by the addition of phosgene to a slurry of the sodium salt of 2,2-bis-(4-hydroxyphenyl)-propane in an inert polymer solvent such as chlorobenzene. The organic solvent should preferably be a polymer solvent but need not necessarily be a good solvent for the reactants.

Generally speaking, a haloformate such as the bishaloformate of 2,2-bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whethe aqueous base or pyridine is used as an acid acceptor. The polymer may be precipitated from the solution by adding a polymer non-solvent, such as heptane or isopropanol. Alternatively, the polymer solution may be heated to evaporate the solvent.

With respect to components (b) and (c) the hydrogenated block copolymers are made by means known in the art and they are commercially available.

Prior to hydrogenation, the end blocks of these copolymers comprise homopolymers or copolymers preferably prepared from alkenyl aromatic hydrocarbons and particularly vinyl aromatic hydrocarbons wherein the aromatic moiety may be either monocyclic or polycyclic. Typical monomers include styrene, alpha methyl styrene, vinyl xylene, ethyl vinyl xylene, vinyl naphthalene, and the like, or mixtures thereof. The end blocks (A) and (A)[1], may be the same or different. They are preferably selected from styrene, α-methyl styrene, vinyl toluene, vinyl xylene, vinyl naphthalene, especially styrene. The center block (B) may be derived from, for example, butadiene, isoprene, 1,3-pentadiene, 2,3-dimethyl butadiene, and the like, and it may have a linear, sequential or teleradial structure.

The selectively hydrogenated linear block copolymers are described in Haefele et al, U.S. Pat. No. 3,333,024, which is incorporated herein by reference.

The ratio of the copolymers and the average molecular weights can vary broadly although the molecular weight of center block should be greater than that of the combined terminal blocks. It is preferred to form terminal blocks A having average molecular weights of 2,000 to 100,000 and center block B, e.g., a hydrogenated polybutadiene block with an average molecular weight of 25,000 to 1,000,000. Still more preferably, the terminal blocks have average molecular weights of 8,000 to 60,000 while the hydrogenated polybutadiene polymer blocks have an average molecular weight between 50,000 and 300,000. The terminal blocks will preferably comprise 2 to 60% by weight, or more, preferably, 15 to 40% by weight, of the total block polymer. The preferred copolymers will be those formed from a copolymer having a hydrogenated/saturated polybutadiene center block wherein 5 to 55%, or more, preferably, 30 to 50% of the butadient carbon atoms, are vinyl side chains.

The hydrogenated copolymers will have the average unsaturation reduced to less than 20% of the original value. It is preferred to have the unsaturation of the center block B reduced to 10%, or less, preferably, 5% of its original value.

The block copolymers are formed by techniques well known to those skilled in the art. Hydrogenation may be conducted utilizing a variety of hydrogenation catalysts such as nickel or kieselguhr, Raney nickel, copper chromite, molybdenum sulfide and finely divided platinum or other nobel metals on a low surface area carrier.

Hydrogenation may be conducted at any desired temperature or pressure, from atmospheric to 300 psig, the usual range being between 100 and 1,000 psig at temperatures from 75° F. to 600° F. for times between 0.1 and 24 hours, preferably, from 0.2 to 8 hours.

Hydrogenated block copolymers such as Kraton G - 6500, Kraton G - 6521, Kraton G - 1650, Kraton G - 1651 and Kraton G - 1652 from Shell Chemical Company, Polymers Division, have been found useable according to the present invention. Kraton G - 1650 is preferred. Also useable are the so-called hydrogenated Solprenes of Phillips, especially the product designated Solprene - 512.

The radial teleblock copolymers of which the Solprenes are typical examples can be characterized as having at least three polymer branches with each branch of the radial block polymer comprising terminal non-elastomeric segments, e.g. (A) and (A$^1$) as defined hereinabove. The branches of the radial block polymer contain a terminal non-elastomeric segment attached to an elastomeric polymer segment, e.g. (B) as defined above. These are described in Marrs, U.S. Pat. No. 3,753,936 and in Zelinski, U.S. Pat. No. 3,281,383, both of which are incorporated herein by reference, and they are selectively hydrogenated by procedures known per se. In any event, the term "selective hydrogenation" is used herein to contemplate polymers in which the elastomeric blocks (B) have been hydrogenatd, but the non-elastomeric blocks (A) and (A$^1$) have been left unhydrogenated, i.e., aromatic.

As is mentioned above, other additives may be present in the compositions, such as pigments, e.g., titanium dioxide.

With respect to component (b), a variety of polyolefins can be used with the block copolymer to form the premix. In general, it is preferred to use polyethylene or a poly-α-olefin or a copolymer of α-olefins, the α-olefin having from 3 to 8 carbon atoms. These can be made by known precedures and are readily available from a number of sources. Especially preferred are polyethylene or polypropylene and their copolymers and block copolymers, e.g., ethylene-propylene copolymer, etc.

With respect to one aspect of component (b), the styrene resins most suitable are polymers of vinyl aromatic hydrocarbons prepared by polymerizing at least one alkenylaromatic hydrocarbon of the benzene series and include the polymers of styrene and ring-substituted styrene wherein the aromatic nucleus is substituted with one or more alkyl groups preferably containing from 1 to 4 carbon atoms such as methyl or ethyl or with a halogen group such as a chloro group. Examples of such monomers are styrene, vinyl toluene, vinyl xylene, vinyl ethyl benzene, and divinyl benzene. Suitable monomers also include chain-substituted styrenes such as alpha-methyl styrene. Preferably, these polymers have an intrinsic viscosity of from 0.5 to 1.5, especially in the range of 0.6 to 1.0 dl./g., as determined using a 0.25 g./100 ml. solution in toluene at 30° C.

The styrene resins most preferred are those having at least 25% by weight polymer units derived from vinyl aromatic monomer having the formula

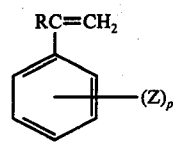

wherein R is hydrogen, alkyl of 1 to 4 carbon atoms or halogen; Z is a member selected from the class consisting of vinyl, hydrogen, or alkyl of from 1 to 4 carbon atoms; and $p$ is from 1 to 5. The preferred styrene resins for purposes of this invention are polystyrene homopolymers.

The amount of elastomeric block copolymer and polyolefins or polystyrene or polycarbonate dispersing agent, if used, combined, then added to the aromatic polycarbonate resin will vary from 1 to 40% by weight of the composition.

Of course, other additives may be present in the compositions, such as plasticizers, pigments, flame retardants, and the like, in amounts varying between about 1 and 100 parts by weight of the total resinous components (a), (b) and (c) in the composition. The above-stated ranges for amounts of the aromatic polycarbonate resin (a), the precompounded blend of polyolefin styrene and the hydrogenated elastomeric block copolymer resin (c), if present, is based solely upon such resinous components in the polymer blend and excludes other additives.

Among the features of this invention are reinforced compositions containing reinforcing amounts of reinforcements, such as powders whiskers, fibers or platelets of metals, e.g., aluminum, bronze, iron or nickel, and non-metals, e.g., carbon filaments, acicular CaSiO$_3$, asbestos, TiO$_2$, titanate whiskers, glass flakes, and the like. Such reinforcements will be present in an amount of, e.g., 2 to 90% by weight, preferably 10 to 60% by weight. Especially preferred as a reinforcement is fibrous glass.

The method of forming the polymer composition is not critical, so long as component (b) is precompounded. Any prior art blending technique is generally suitable. The preferred method comprises blending the polymers and any additives, such as reinforcements in powder, granular and filamentous form — as the case may be — extruding the blend and chopping into pellets suitable for molding to shape by means conventionally used to mold normally solid thermoplastic compositions.

DESCRIPTION OF THE PREFERRED EMBODIMENTS

The following examples are set forth as further description of the invention, but are not to be construed as limiting the invention thereto.

The formulations are produced by a general procedure comprising mechanically blending then co-extruding in a twin screw Werner Pfleiderer (WP) extruder at 300° C. and molding into test pieces in a reciprocating screw injection molding machine at about 300° C. (cylinder) and 105° C. (mold). To make component (b), the block copolymer and the olefinic resin or styrene resin are master-batched by precompounding at 290° C. in a twin screw WP or in an adequate rubber processing machine first. The physical tests are carried out by the following procedures: Izod impact strength on ⅛ inch notched specimens; tensile strength and stiffness on DIN tensile bars, drawing rate 0.5 cm./min.; E modulus with an extentiometer on DIN type bars, heat distortion temperature at 264 psi on ⅛ inch bars; flow length at 280° C. and at 300° C. cylinder temp. at 100° C. mold temperature at 75% of maximum injection rate plus injection pressure under constant control. Environmental stress cracking resistance is measured under flexural loading with 0.25% strain and full immersion in carbon tetrachloride. Dispersion quality is determined by visually inspecting broken DIN tensile bars (Drawn at a rate of 50 cm./min.). Stress relaxation is visually determined in air under a constant tensile deformation of 2.8% for 24 hours on DIN tensile bars.

EXAMPLES 1–4

The following formulations are prepared, molded and tested:

Table.

Compositions of Aromatic Polycarbonate Resin and Premix of Hydrogenated Block Copolymer and Polyolefin

| Example | 1A[a] | 1 | 2 | 3A[a] | 3 | 4 |
|---|---|---|---|---|---|---|
| Composition (parts by weight) | | | | | | |
| poly(2,2-diphenylpropane) carbonate[b] | 100 | 95 | 90 | — | — | — |
| poly(2,2-diphenylpropane) carbonate[c] | — | — | — | 100 | 95 | 90 |
| Hydrogenated styrene-butadiene styrene block copolymer[d] | — | 1.25 | 2.5 | — | 1.25 | 2.5 |
| polyethylene resin[e] | — | 1.25 | 2.5 | — | 1.25 | 2.5 |
| poly(2,2-diphenyl-propane)carbonate[b] | — | 2.5 | 5.0 | — | 2.5 | 5.0 |
| Properties | | | | | | |
| Heat distortion temp. at 266 psi., ° C. | 137 | 134 | 135 | 139 | 137 | 135 |
| Flow length, cm. at 280° C. | 38 | 47 | 47 | 29 | 34 | 38 |
| at 300° C. | 44 | 52 | 54 | 33 | 40 | 44 |
| Izod impact strength, J/cm² | 7.9 | 7.4 | 6.9 | 9.1 | 8.4 | 7.6 |
| Tensile yield strength, kgf./cm² | 615 | 580 | 565 | 610 | 575 | 555 |
| E modulus, kgf./cm² | 26,200 | 25,000 | 22,600 | 26,000 | 23,000 | 23,000 |
| Stress cracking, initiation after | 31 sec. | 4 min. | N.D. | 45 sec. | 6 min. | N.D. |
| catostrophic failure | 1 min. | 4 min. | N.D. | 50 sec. | 6 min. | N.D. |

[a]Control
[b]General Electric Co., Lexan 125
[c]General Electric Co., Lexan 100
[d]Shell Chemical Kraton G 1650
[e]D.S.M. Co., PE 1100
[f]Premix Flowability and stress crack resistance are markedly improved. In addition, with Examples 1 and 2 there is no lamination, and with 3 and 4 there are only a few coarse laminations. In contrast to controls 1A and 3A which had many crazes and some crazes, respectively, after the stress relaxation tests, Examples 1 and 3 showed no crazes.

The following additional compositions within the scope of this invention can be prepared and will have advantageous properties, especially improved impact resistance, environmental stress crack resistance, and greatly improved flowability.

| Composition (parts by weight) | | |
|---|---|---|
| poly(2,2-diphenylpropane) carbonate | 97 | 95 |
| hydrogenated styrene-butadiene styrene block copolymer[b] | 0.75 | 0.75 |
| d { polyethylene resin[c] | 0.75 | 0.75 |
| styrene homopolymer | 1.5 | 1.5 |
| hydrogenated styrene-butadiene-styrene block copolymer[b] | — | 2 |

[a]See Examples 1–4, footnote c
[b]See Examples 1–4, footnote d
[c]See Examples 1–4, footnote e
[d]Premix Many variations will suggest themselves to those skilled in this art in view of the above, detailed description. All such variations are within the full intended scope of the appended claims.

We claim:

1. A high impact strength thermoplastic composition comprising an intimate blend of:
   (a) an aromatic polycarbonate resin; and
   (b) a precompounded composition comprising from 80 to 20 parts by weight of an olefinic resin comprising polyethylene or a poly-α-olefin resin, alone or in further combination with an aromatic polycarbonate resin or a styrene resin, and correspondingly from 20 to 80 parts by weight of a selectively hydrogenated linear, sequential or radial teleblock copolymer of a vinyl aromatic compound $(A)_n$ and $(A)_n^1$ and an olefinic eastomer (B), of the A—B—A$^1$; A-(B-A-B)$_n$-A; A(BA)$_n$B; $(A)_4$B; B(A)$_4$; or B[(AB)$_n$B]$_4$ type, wherein n is an integer of from 1 to 10; and optionally,
   (c) a selectively hydrogenated elastomeric block copolymer of one of the types set forth in (b).

2. A composition as defined in claim 1 wherein component (a) comprises from 99 to 60 parts by weight and component (b) comprises from 1 to 40 parts by weight and component (c) comprises from 0 to 20 parts by weight of the total weight of components (a), (b) and (c).

3. A composition as defined in claim 1 wherein component (b) comprises from 80 to 20 parts by weight and component (c) from 20 to 80 parts by weight of the total weight of (b) and (c).

4. A composition as defined in claim 1 wherein component (a) is an aromatic polycarbonate of a dihydric phenol and a carbonate precursor.

5. A composition as defined in claim 4 wherein said aromatic polycarbonate is a polycarbonate of bisphenol-A.

6. A composition as defined in claim 1 wherein, in components (b) and (c), (A) and (A)$^1$ are selected from styrene, α-methyl styrene, vinyl toluene, vinyl xylene and vinyl naphthalene and (B) is selected from butadiene, isoprene, 1,3-pentadiene or 2,3-dimethylbutadiene.

7. A composition as defined in claim 6 wherein, in components (b) and (c), (A) is a styrene block, (B) is an olefin block, and (A)$^1$ is a styrene block.

8. A composition as defined in claim 7 wherein, in components (b) and (c), terminal blocks (A) and (A)$^1$ have molecular weights of 2,000 to 100,000, respectively, and center block (B) has a molecular weight of from 25,000 to 1,000,000.

9. A composition as defined in claim 1 wherein, in component (b), said olefinic resin is polyethylene, polypropylene, or an ethylene-propylene copolymer.

10. A composition as defined in claim 1 wherein, in component (b), the styrene resin comprises a styrene homopolymer or the polycarbonate resin comprises poly(2,2-diphenylpropane) carbonate.

* * * * *

UNITED STATES PATENT AND TRADEMARK OFFICE
CERTIFICATE OF CORRECTION

PATENT NO. : 4,122,131

DATED : Oct. 24, 1978

INVENTOR(S) : Jan Bussink, Johannes Wilhelmus Jacobus DeMunck and Petrus Cornelius Aloysius Maria van Abeelen It is certified that error appears in the above-identified patent and that said Letters Patent are hereby corrected as shown below:

Column 1, line 18, "section" should read --sections--.

Column 1, line 28, "No." should read --Publication--.

Column 1, lines 36-37, "filed concurrently herewith, under Attorney's Docket GE-708 (8CH-2705)" should read --filed September 14, 1977,--

Column 4, line 27, "whethe" should read --whether--.

Signed and Sealed this

Thirtieth Day of October 1979

[SEAL]

Attest:

RUTH C. MASON
Attesting Officer

LUTRELLE F. PARKER
Acting Commissioner of Patents and Trademarks